(12) United States Patent
Abidi

(10) Patent No.: US 11,929,899 B2
(45) Date of Patent: Mar. 12, 2024

(54) AUTOMATION LOGIC TO PROACTIVELY ISOLATE LAYER 1 FAULTS IN A LEASED UNMONITORED NETWORK

(71) Applicant: AT&T Intellectual Property I, L.P., Atlanta, GA (US)

(72) Inventor: Mohammad Abidi, Manalapan, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 43 days.

(21) Appl. No.: 17/524,525

(22) Filed: Nov. 11, 2021

(65) Prior Publication Data

US 2022/0103447 A1  Mar. 31, 2022

Related U.S. Application Data

(62) Division of application No. 16/529,231, filed on Aug. 1, 2019, now Pat. No. 11,178,031.

(51) Int. Cl.
*H04L 41/0659* (2022.01)
*H04L 41/0677* (2022.01)
(Continued)

(52) U.S. Cl.
CPC ...... *H04L 43/0811* (2013.01); *H04L 41/0659* (2013.01); *H04L 41/0677* (2013.01);
(Continued)

(58) Field of Classification Search
CPC . H04J 3/085; H04J 3/14; H04J 3/1611; H04L 41/0659; H04L 43/10; H04L 45/00; H04L 45/50; H04L 43/0811
(Continued)

(56) References Cited

U.S. PATENT DOCUMENTS

| 6,147,783 A | * | 11/2000 | Ikawa | H04J 3/14 398/5 |
| 6,411,598 B1 | * | 6/2002 | McGlade | H04L 41/0659 370/244 |

(Continued)

*Primary Examiner* — Harun Chowdhury
(74) *Attorney, Agent, or Firm* — Guntin & Gust, PLC; Miyoung Shin

(57) ABSTRACT

A comprehensive integrated system and method includes (i) proactively monitoring a network for degraded service and to proactively make repairs to components before service outages, (ii) identifying the root causes of hard alarms and failures on a layer 1 transport network and generate trouble tickets; and (iii) after repair, verifying that repaired backbone network meets or exceeds performance criteria of Service Level Agreements (SLAs) with customers. A method includes surveilling first equipment in a network wherein the first equipment is in a controlled portion of the network, observing a set of messages wherein the set of messages relate to second equipment in a leased portion of the network, and detecting a fault in the network based on the surveilling step or the observing step. A fault based on the observing step includes the steps of receiving a first message at a first server indicating that a fault was detected in a portion of a leased network, receiving a second message at a second server indicating that the fault was detected in a portion of the leased network, and isolating the fault based on the first message and the second message.

20 Claims, 7 Drawing Sheets

(51) Int. Cl.
    *H04L 41/50*         (2022.01)
    *H04L 43/0811*     (2022.01)
    *H04L 43/16*         (2022.01)
    *H04L 43/55*         (2022.01)

(52) U.S. Cl.
    CPC .......... *H04L 41/5077* (2013.01); *H04L 43/16* (2013.01); *H04L 43/55* (2022.05)

(58) Field of Classification Search
    USPC ............... 370/217, 225, 244, 245; 398/5
    See application file for complete search history.

(56) References Cited

U.S. PATENT DOCUMENTS

| | | | |
|---|---|---|---|
| 7,602,700 B1* | 10/2009 | Bakhru | H04L 45/00 370/216 |
| 10,128,943 B2 | 11/2018 | Abidi | |
| 2009/0161562 A1* | 6/2009 | Shah | H04L 43/10 370/245 |
| 2010/0157813 A1 | 6/2010 | Matsuura | |
| 2012/0106948 A1 | 5/2012 | Moynihan et al. | |
| 2015/0215032 A1 | 7/2015 | Bevilacqua et al. | |

\* cited by examiner

AUTOMATION LOGIC TO PROACTIVELY ISOLATE LAYER 1 FAULTS IN A LEASED UNMONITORED NETWORK

CROSS REFERENCE TO RELATED APPLICATIONS

This application is a division of, and claims priority to, U.S. patent application Ser. No. 16/529,231, filed Aug. 1, 2019, now U.S. Pat. No. 11,178,031, entitled "Automation Logic To Proactively Isolate Layer I Faults In A Leased Unmonitored Network," the entire contents of which are hereby incorporated herein by reference.

TECHNICAL FIELD

This disclosure relates generally to automatic fault and performance monitoring, and more particularly, to a system and method for implementing logic to proactively monitor layer 1 backbone internet transport network with or without leased sections, isolate root cause of degraded or failed service, repair faults and verify that repaired backbone network meets or exceeds performance criteria of SLAs.

BACKGROUND

A Tier 1 Internet Service Provider (ISP) exchanges internet traffic with other Tier 1 providers. These ISPs typically exchange traffic through peer-to-peer connectivity. Together, Tier 1 ISPs form the backbone of the internet, providing the infrastructure to haul local and long-distance internet traffic. A Tier 2 ISP will also exchange traffic with other Tier 2 ISPs through peer-to-peer connectivity but also purchase transport from Tier I ISPs. Tier 2 ISPs provide the inter-connectivity between Tier 3 ISPs and Tier 1 ISPs, the Tier 3 ISPs providing the last-mile connectivity to homes and businesses.

As such, Tier 1 and Tier 2 ISPs transport large amount of data rapidly and must do so with a high degree of reliability. Tier1 and Tier 2 ISPs often need to support 100G/40G Ethernet and wavelength point to point on their networks. The backbone networks are being built with high bandwidth 40/100 Gbps. Such ISPs typically use fiber between network elements on optical networks such as Optical Transport Network (OTN), Dense Wavelength Division Multiplexing (DWDM) networks, Synchronous Optical Networking (SONET) and Synchronous Digital Hierarchy (SDH) networks to obtain the speed demanded by users and customers.

To provide service reliability and availability there is a need to monitor and repair failures on the ISP transport network forming the IP back-bone. Hard failures or degraded service may manifest themselves due as performance monitoring errors on either the transport facilities or SONET, SDH, DWDM, or OTN network elements.

Moreover, as Tier1 and Tier 2 ISPs span international boundaries, such ISPs sometimes they do not have enough capacity on their transport network for the internet backbone or they do not own transport network between all of their Tier1 IP routers or between Tier1 and Tier 2 IP routers. This means that ISPs may need to lease transport facilities and network elements for their IP back-bone network, causing issues with respect to monitor the health and performance of their backbone network.

Accordingly, there is a need for a system and method for automatically detecting, isolating and correcting faults and degraded performance in backbone transport networks.

SUMMARY

The present disclosure is directed to a method including receiving a first message at a first server indicating that a fault was detected in a portion of a leased network, receiving a second message at a second server indicating that the fault was detected in a portion of the leased network and isolating the fault based on the first message and the second message.

In an aspect, the first message is a Line Alarm Indication Signal (LAIS) message and the second message is a first Path Alarm Indication Signal (PAIS) message and the isolating step identifies the fault occurred in a portion of the leased network upstream of the second server. The method may further include receiving a third message at the first server and further isolating the fault based on the third message. In an aspect, the third message is a second PAIS message and the isolating step identifies the fault upstream of the first server or alternatively, the third message is a Path Remote Detect Indication ("PRDI") message and the isolating step identifies the fault between the first server and the second server. In an aspect, the first message is a Path Alarm Indication Signal (PAIS) message and the second message is a Path Remote Detect Indication ("PRDI") message, and the method further includes receiving a third message at the first server, the third message being a Line Alarm Indication Signal (LAIS) message, and wherein the isolating step identifies the fault between the first server and a line terminating equipment point in the leased network.

In an aspect, the first message is a Path Alarm Indication Signal (PAIS) message and the second message is a Path Remote Detect Indication ("PRDI") message, and the method further includes receiving a third message at the second server, the third message being a Line Alarm Indication Signal (LAIS) message, and wherein the isolating step identifies the fault between the second server and a line terminating equipment point in the leased network. In another aspect, the first message is a Path Alarm Indication Signal (PAIS) message and the second message is a Path Remote Detect Indication ("PRDI") message, and the method further includes receiving a third message at the first server, the third message being a section Loss of Signal (LOS) message, and wherein the isolating step identifies the fault between the first server and a section terminating equipment point in the leased network. In yet another aspect, the first message is a Path Alarm Indication Signal (PAIS) message and the second message is a Path Remote Detect Indication ("PRDI") message, and the method further includes receiving a third message at the second server, the third message being a section Loss of Signal (LOS) message, and wherein the isolating step identifies the fault between the second server and a section terminating equipment point in the leased network.

The present invention is also directed to a method including surveilling first equipment in a network wherein the first equipment is in a controlled portion of the network, observing a set of messages wherein the set of messages relate to second equipment in a leased portion of the network and detecting a fault in the network based on the surveilling step or the observing step. In an aspect, the fault is detected based on the surveilling step and the surveilling step includes monitoring a power level of a laser and wherein a power level of a laser is detected as being outside of a threshold. In an aspect, the fault is detected based on the surveilling step and wherein the surveilling step determines a degradation in performance.

In an aspect, the fault is detected based on the observing step and the observing step includes receiving a first message at a first server indicating that a fault was detected in a portion of a leased network, receiving a second message at a second server indicating that the fault was detected in a portion of the leased network, and isolating the fault based on the first message and the second message. In an aspect, he method of claim 17 wherein the first message is a Line Alarm Indication Signal (LAIS) message and the second message is a first Path Alarm Indication Signal (PAIS) message and the isolating step identifies the fault occurred in a portion of the leased network upstream of the second server. In an aspect, the method further comprising receiving a third message at the first server and wherein the third message is a Path Remote Detect Indication ("PRDI") message and the isolating step identifies the fault between the first server and the second server. In an aspect, the first message is a Path Alarm Indication Signal (PAIS) message and the second message is a Path Remote Detect Indication ("PRDI") message, and further comprising receiving a third message at the first server, the third message being a Line Alarm Indication Signal (LAIS) message and wherein the isolating step identifies the fault between the first server and a line terminating equipment point in the leased network.

The present invention is also directed to a method to verify that fault has been repaired and meets SLAs to turn it back in service.

BRIEF DESCRIPTION OF THE DRAWINGS

In the following description, for purposes of explanation, numerous specific details are set forth in order to provide an understanding of the variations in implementing the disclosed technology. However, the instant disclosure may take many different forms and should not be construed as limited to the examples set forth herein. Where practical, like numbers refer to like elements throughout.

DETAILED DESCRIPTION

Figure 1:
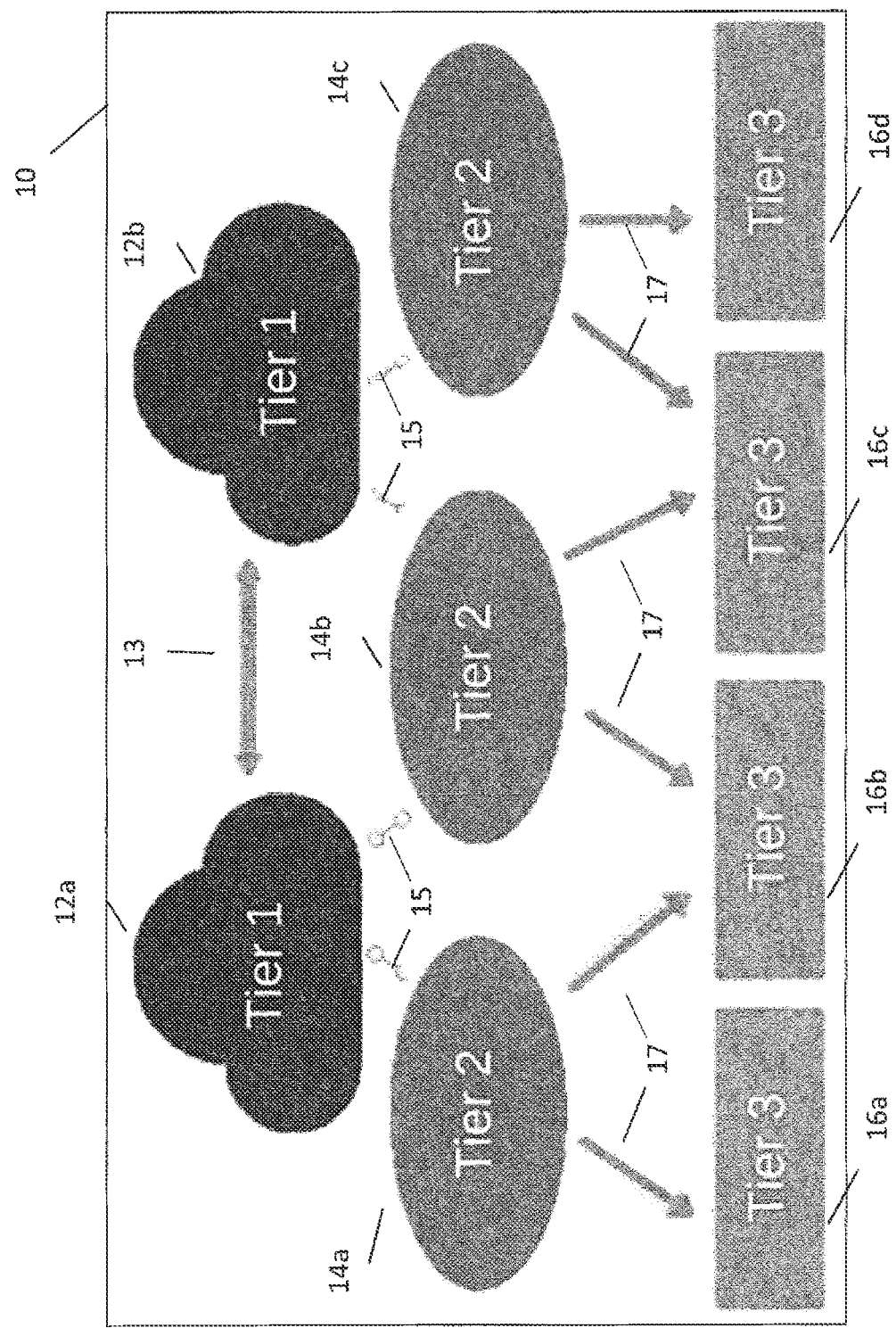
FIG. 1. is an exemplary representation of the multiple tier architecture used to provide internet services and internet back bone transport network.

Overview. As detailed herein, the present disclosure is directed to a system and method to provide effortless customer experience across internet backbone networks. Described herein is a novel methodology to provide automated trouble isolation and service verification of repairs of high bandwidth 100 Gbps/40 Gbps internet backbone Ethernet or wave length circuits carried over optical transport networks over Domain1 & Domain2 network elements between Tier1 IP Routers or between Tier1 and Tier 2 IP Routers. The systems and methods of the automated system comprise a practical application that advances the state of telecommunications technology.

U.S. Pat. No. 10,128,943 entitled Predictive Maintenance of Optical Transport Network Systems having a common inventor and assigned to the assignee of the present disclosure and hereby incorporated by reference in its entirety, provides a system for predictive maintenance of optical network elements by routine optical power level monitoring. This disclosure goes beyond use of monitoring power levels for predictive maintenance as it also covers partially leased sections in IP networks. The disclosure also provides methods to isolate troubles using Digital Performance Monitoring Data and hard alarms as well as providing methods to verify repair of troubles once fixed by a repair entity.

The disclosure includes a comprehensive integrated solution to provide the proactively monitoring, identifying root causes and verifying repairs described herein. The disclosure includes integrated systems and methods to (i) proactively monitor for degraded service and to proactively make repairs to components before service outages, (ii) identify the root causes of hard alarms and failures on a layer 1 transport network and generate trouble tickets; and (iii) verify that repaired backbone network meets or exceeds performance criteria of Service Level Agreements (SLAs) which may have been pre-determined with customers.

With respect to (i) above, the automated system may proactively monitor TCA, PM Errors and power levels of lasers on a regular basis to determine whether those levels are within established thresholds. If they are reported as below the established thresholds, a maintenance activity may be scheduled to remove the component causing degrading of the service. This will reduce intermittent and hard failures on these backbone circuits.

With respect to (ii), when there are hard alarms, such as receiving alarm messages at ISP servers positioned within the backbone transport network that monitor and route internet traffic, those hard alarms are acted upon to isolate the failures most likely associated with the alarms. For the portion of the network that is owned or directly surveilled by the ISP Tier 1 provider, the components in the backbone network may be directly surveilled. The portion of the network that is owned or directly surveilled b the Tier 1 service provider may be referred to as the controlled portion of the network. For the portion of the network that is leased or otherwise not owned or controlled by the ISP Tier 1 provider, two or more servers acting as or interacting with path termination equipment may receive alarm messages and by comparing the types of messages, may further isolate the cause of the fault, regardless of whether the fault is in the leased portion or the owned portion of the backbone network. Trouble tickets may be then generated and sent to either maintenance personnel of the ISP Tier 1 provider or the provider operating the leased portion of the network.

After the repair, the disclosure includes systems and methods for testing to ensure there are no additional alarms present and then the circuit is returned to service. The method also confirms the absence of performance monitoring errors. In an aspect, the repair certification process may begin with an automatic trigger from a service provider entity that has just completed a repair. Upon reception of the trigger, the system may first to check for both service affecting and non-service affecting alarms. If there are no service-affecting alarms, the methodology proposes to gather last fifteen appropriate PM Error data (CV, ES, SES, SEFS, UAS, FC, FCSERR, HCCS, etc.) as well as Power Levels from the two ends of the backbone network or segment of the network. If after checking the power levels and it is determined that they are outside the high and low water marks, a trouble ticket may be created. If there are no power level issues, then the performance monitoring metrics are compared to determine if they are below a tunable (default zero) threshold based on the SLA with the customer. If the performance management error exceeds the threshold, a trouble ticket may be created. Otherwise, the performance management error is determined to be within the relevant thresholds and the process may be paused and repeated periodically.

Operating Environment. With respect to FIG. 1, there is shown a topology 10 of an exemplary tiered internet service provider architecture. Tier 1 providers 12a, 12b are shown connected through a communication path 13. Tier 2 providers 14a, 14b, and 14c, are shown as connected to Tier 1 providers 12a, 21b through communication paths 15. Combined, Tier 1 and Tier 2 provide the internet backbone for data transport. Also shown are Tier 3 providers 16a, 16b, 16c and 16d. The Tier 3 providers communicate to the internet backbone through connections 17 to the Tier 2 providers 14a, 14b, 14c and in turn provide internet services to consumers, businesses or other devices such as IoT devices. It will be understood by those skilled in the art that FIG. 1 is exemplary only and there may be other topologies or internet service provider architectures relevant to the present disclosure.

Figure 2:
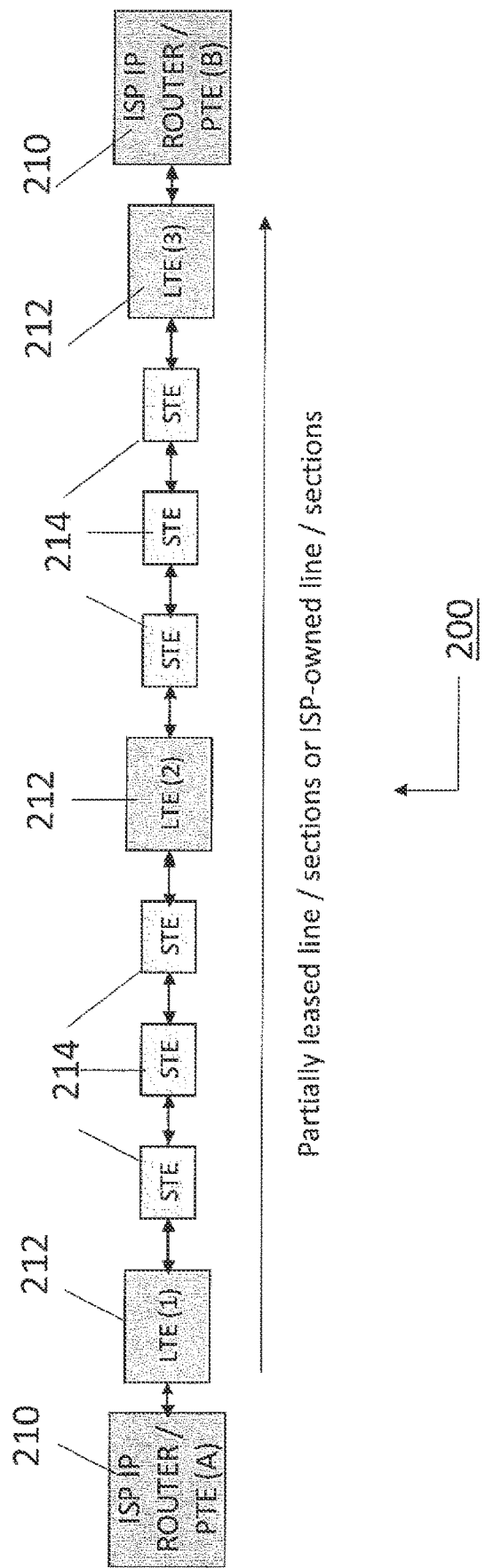
FIG. 2 is an exemplary representation of a backbone transport network in which the path terminating equipment is an ISP IP router and the backbone transport network is owned or operated by an ISP Tier 1 service provider.

With respect to FIG. 2, there is shown an exemplary architecture of a portion of a backbone network 200 which may be partially leased or owned outright by the internet service provider "ISP" backbone service provider which may, for example, be a Tier 1 service provider. While the exemplary architecture shown comprises point-to-point communications paths, it will be understood that switches within the backbone network 300 may provide alterative routing within the backbone network 200. There is shown on either end of the backbone network 200 an ISP Internet Protocol (IP) router acting as path terminating equipment 210. The path terminating equipment 210 is in communication to line terminating equipment 212 which in turn is in communication with section terminating equipment 214 as configured in FIG. 2. For the purposes of this disclosure and unless otherwise indicated herein, "LTE" means "line terminating equipment," "STE" means "section terminating equipment," and "PTE" means "path terminating equipment." The backbone network 200 may, for example be a SONET/SDH network or any other type of optical network or other high bandwidth network.

In this exemplary architecture, it is assumed that the ISP Tier 1 service provider owns or controls the two ISP IP routers 210 (PTE(A) and PTE(B)). As such, the ISP Tier I service provide may be able to directly monitor for alarms or otherwise have access to performance monitoring for the ISP IP Routers 210, PTE (A) and PTE (B) and any LTE 212 and STEs 214 in ISP Tier 1 service provider owned lines or sections.

Figure 3:
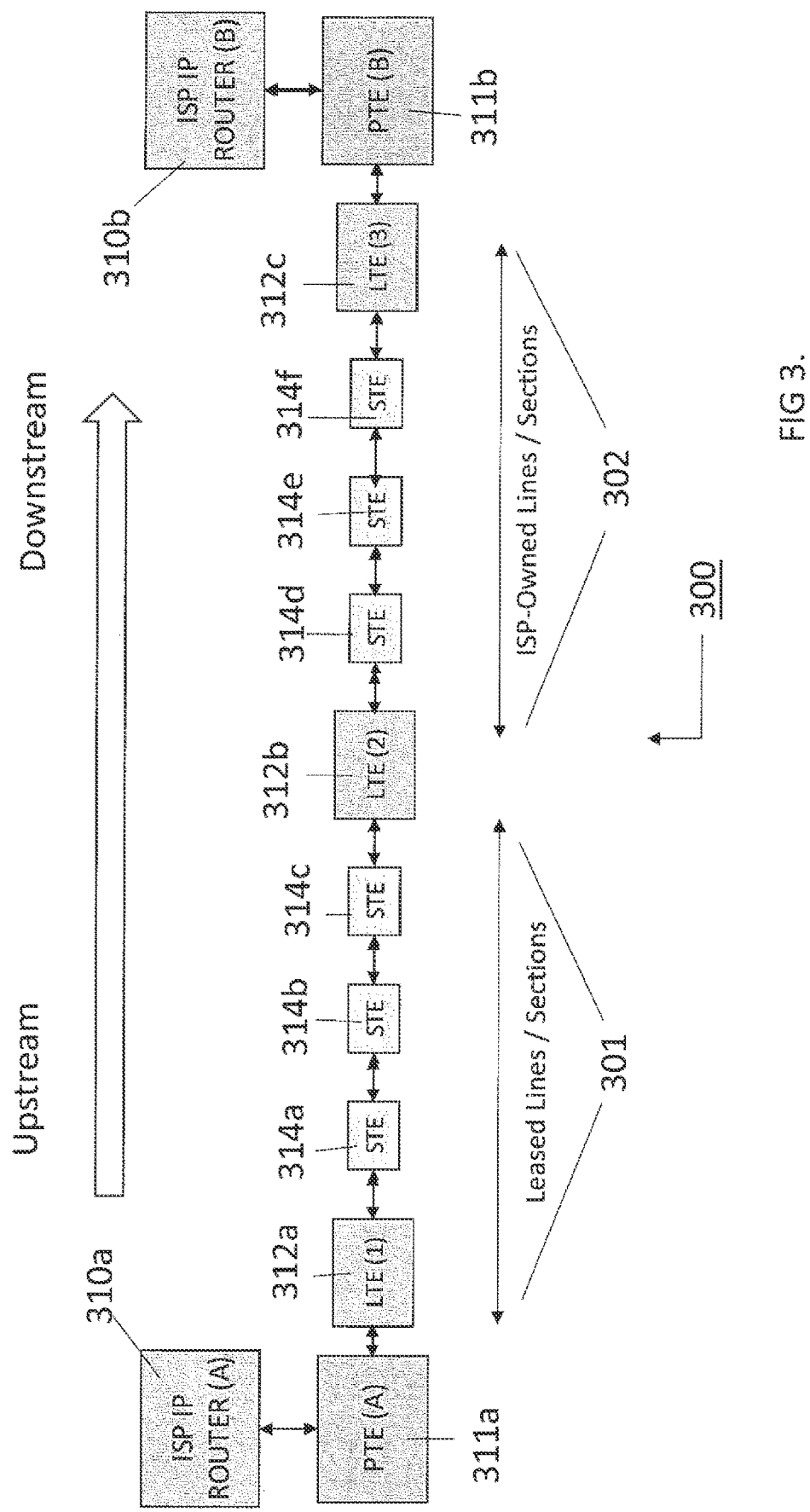
FIG. 3 is an exemplary representation of a backbone transport network in which a portion of that network is leased from a third-party provider of layer1 transport network.

Turning to FIG. 3, there is shown an alternative exemplary embodiment of an Tier 1 transport network 300 in which the ISP Tier 1 service provider owns some, but not all, of the lines and sections and the ISP Tier 1 service provider leases other lines and sections from other service providers. The section of the backbone network 300 is shown as ISP network 302. The backbone network 300 may, for example be a SONET/SDH network or any other type of optical network or other high bandwidth network. In this example, the ISP IP routers 310a, 310b are assumed to be owned by the ISP Tier 1 service provider. Likewise, ISP Tier 1 service provider may provide and own PTE(A) 311a and PTE(B) 311b. PTE(A) 311a and PTE(B) 311b may be in communication with ISP IP Router(A) 310a and ISP IP Router(B) 310b, respectively. Such PTEs may be inserted at various points adjacent to LTEs in leased networks. Also owned by the ISP Tier 1 service provider is LTE(2) 312b and LTE (3) 312c and STEs 314d, 314e and 314f. As such, the ISP Tier 1 service provide may be able to directly monitor for alarms or otherwise have access to performance monitoring for the ISP IP Routers 310a, 310b, PTE(A) 311a and PTE (B) 311b, LTE(2) 312b, LTE(3) 312c, and STEs 314d, 314e, 314f LTE(1) 312a, and STEs 314a, 314b, 314c form lines and sections that may be leased by the ISP Tier 1 service provider, shown as leased network 301. Accordingly, ISP Tier 1 service provide is not able to directly monitor for alarms or otherwise calculate performance measurements on such equipment and lines in leased network 301. In summary, the backbone transport path is composed of multiple sections and lines with the possibility of faults occurring in any section of the path, some of which can be directly monitored by the ISP Tier 1 service provider and other sections without the ability for such direct monitoring.

In an embodiment, ISP IP router(A) 310a and ISP IP router(B) 310b may include automation logic to provide surveillance functions on either side of the backbone network 300. The ISP IP routers 310a, 310b may also be termed "path terminating equipment" in this exemplary configuration. The automation logic may monitor for Path Alarm Indication Signal ("Path AIS" or "PAIS") and Path Remote Detect Indication ("Path RDI" or "PRDI") alarms. These monitors may provide visibility to failures in unmonitored leased backbone networks such as leased network 301. Additional faults to be considered in the present disclosure associated with section terminating equipment and line terminating equipment are Section Loss of Signal (LOS), Section Loss of Frame (LOF), Line AIS (LAIS) or Line RDI (LRDI), each of which may to provide further visibility to failures in unmonitored leased backbone network 301.

As an example, assume that the data flow follows the direction of the arrow in FIG. 3. There is shown an upstream side beginning with ISP IP Router(A) 310a and PTE 311a and terminating on the downstream side of network 300 with PTE 311b and ISP IP Router(B) 310b. It will also be understood that communications through the optical transport network 300 will be bi-directional, so that the upstream and downstream sides are being used for this example only.

Because LTE(1) 312 may be in a leased network, LTE(1) 312 may not be directly surveilled by the Tier 1 ISP service provider. As such, maintenance automation in the ISP IP Router(A) 310a and ISP IP Router(B) monitors would be unaware of any faults occurring in the leased network 301. As such, reports of faults within the leased network 301 will need to be conveyed to ISP IP Routers 310a, 310b where intelligent processing functionality may be able to determine the likely fault.

If an upstream LTE relative to the downstream ISP IP router, in this case, LTE(2) 312b receives a LAIS message, the LTE(2) 312b may generate and send a Path AIS to the downstream ISP IP Router(B) 310b. The LAIS message will alert the downstream ISP IP Router(B) 310b that there is a defect on the incoming line signal of LTE(2) 312b.

The ISP IP routers 310a, 310b would also not directly see a loss of signal in the leased network 301 which caused the generation of the LAIS message. However, because ISP IP Router(B) 310b is surveilled for PAIS and PRDI, automation maintenance logic will be triggered upon receiving the PAIS notification. A result may be to identify a fault in a section beyond LTE(2) 312b on the other side of the downstream ISP IP Router(B) 310b and preliminarily report that fault to the ISP Tier 1 service provider. The preliminary report may indicate that the fault may be localized to the leased network 301 between LTE(1) 312a and LTE(2) 312b.

Further isolation may be performed done when similar automation maintenance logic is applied on the upstream ISP IP Router(A) 310a on the opposite end of the leased network 301 in question. If the upstream ISP IP Router(A) 310a is also reporting receipt of a PAIS, it would imply that there is fiber cut further upstream from the upstream ISP IP Router 310a. The process may be repeated using the automation maintenance logic in additional upstream routers to further localize the faults in other parts of the leased network.

If, on the other hand, the upstream ISP IP Router(A) 310a reports a PRDI which may, for example, be reported by LTE(1) 311a, it would imply that the fault may be in transmission path between the upstream ISP IP Router(A) 310a and downstream ISP IP Router(B) 310b, and more specifically, the fault may be between LTE(1) 311a and LTE(2) 311b in leased network 301. To be more precise, there may be a transponder failure between STE 314a, STE 314b and/or STE 314c connected to LTE(1) 311A that is reporting the PRDI to ISP IP Router(A) 310a and LTE(2) 311b reporting PAIS to the ISP IP Router(B) 301b. respectively.

Similarly, a mirrored situation would occur, if the downstream IP router 332b reports PRDI and the upstream IP router 332a reports PAIS. In that case, if either IP router 332a, 3332b reports receiving LAIS, then the trouble would be in the sections between the IP routers 332a, 332b and the first LTE 312a, 312b, respectively in the leased network 331. If either IP router 332a, 332b reports receiving LOS, then the trouble may be in the section between the IP router 332a, 332b receiving the LOS and the first STE 314a, 314b in the leased network.

Figure 4:
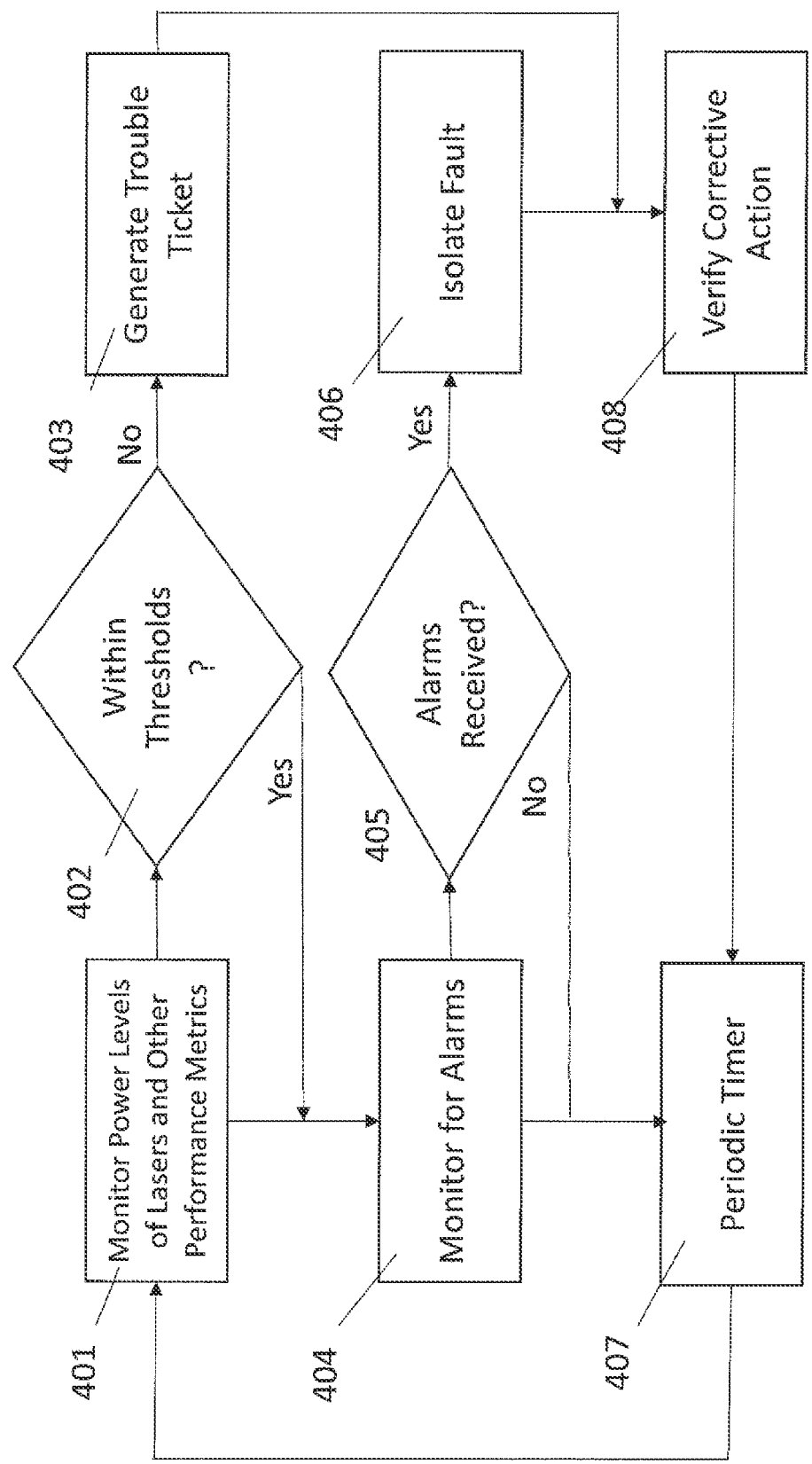
FIG. 4 is an exemplary flowchart of a method proactively monitor for degraded service and to proactively make repairs to components before service outages in accordance with the present disclosure.

Methods of Use. FIG. 4 provides an exemplary use of the integrated system. In this automation methodology, at 401 power levels of laser and other performance metrics are checked on regular basis to confirm that the power levels are within thresholds to provide high performance on these high bandwidth backbone circuits. If they are reported to go below threshold at 402, a trouble ticket may be generated at 403 in which a maintenance activity may be scheduled to remove the component causing degrading of the service. This removal and replacement of an element will help reduce intermittent and hard failures on these backbone circuits. For example, the degraded service caused by laser being close to its thresholds may causes retransmission of packets across the backbone network, effectively reducing throughput and quality of service.

Figure 5:
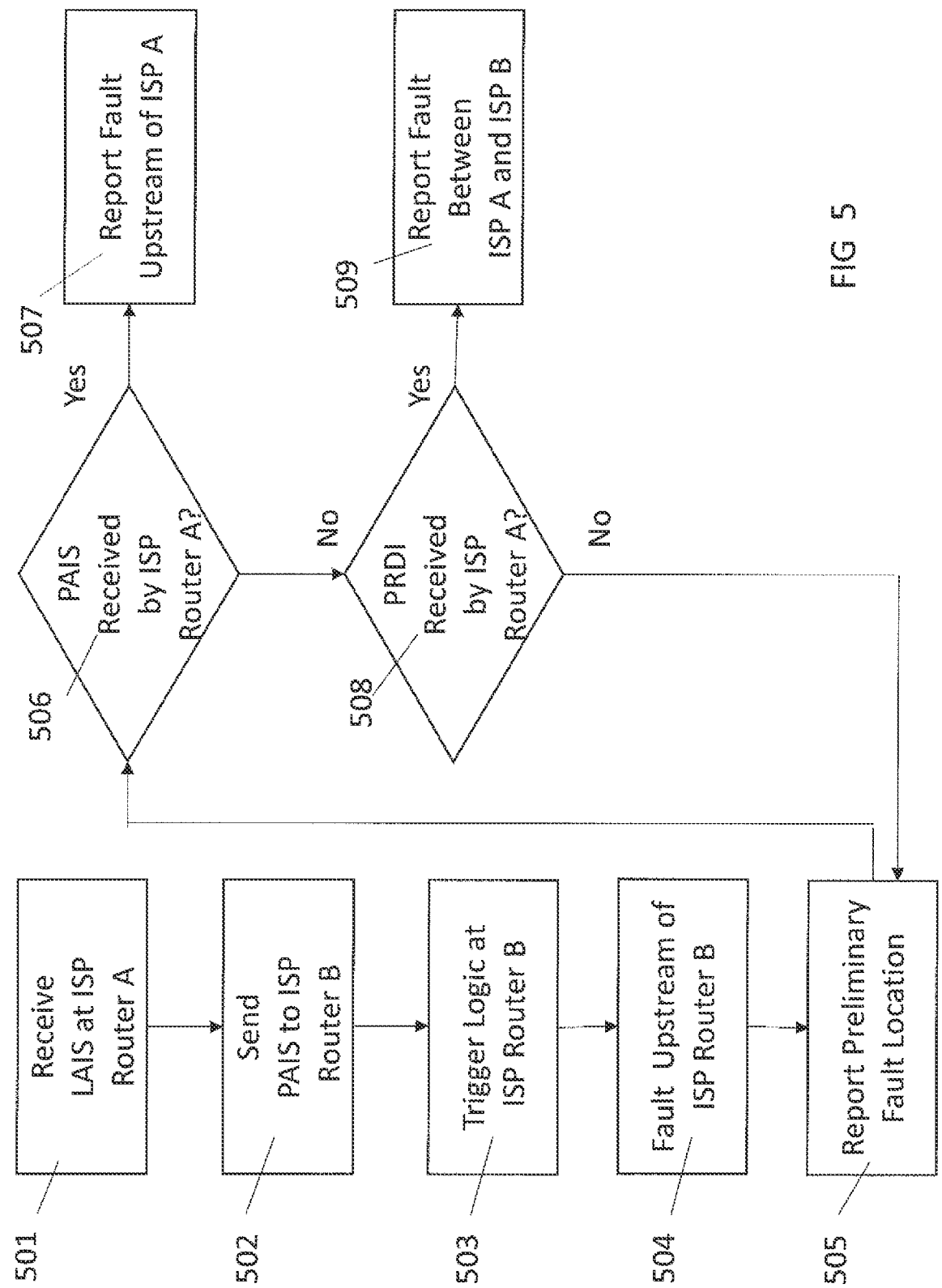
FIG. 5 is an exemplary flowchart of a fault isolation process to identify the root causes of hard alarms and failures on a layer 1 transport network with leased sections and generate trouble tickets in accordance with the present disclosure.
Figure 6:
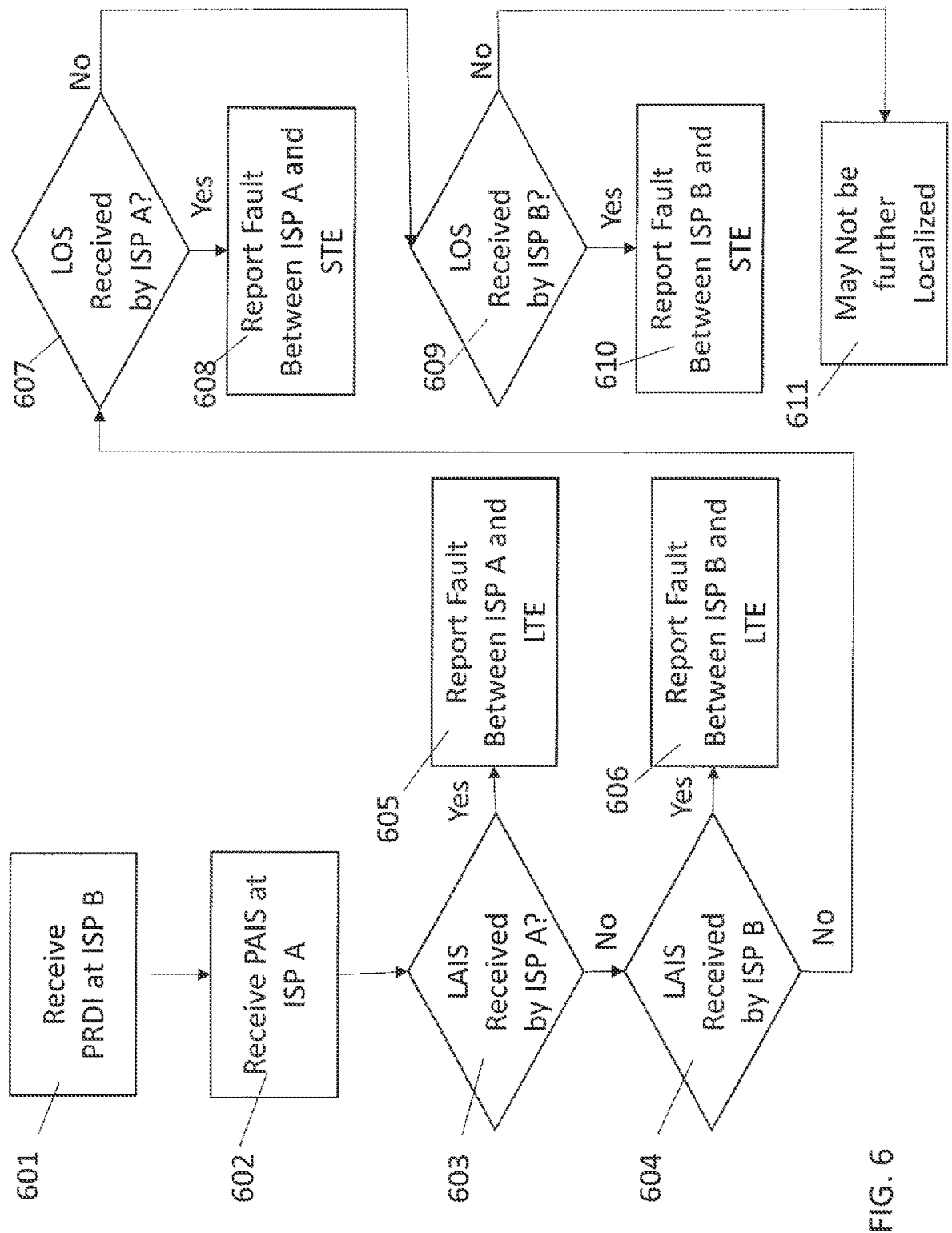
FIG. 6 is an exemplary flowchart of an additional fault isolation process identify the root causes of hard alarms and failures on a layer 1 transport network with leased sections and generate trouble tickets in accordance with the present disclosure.
Figure 7:
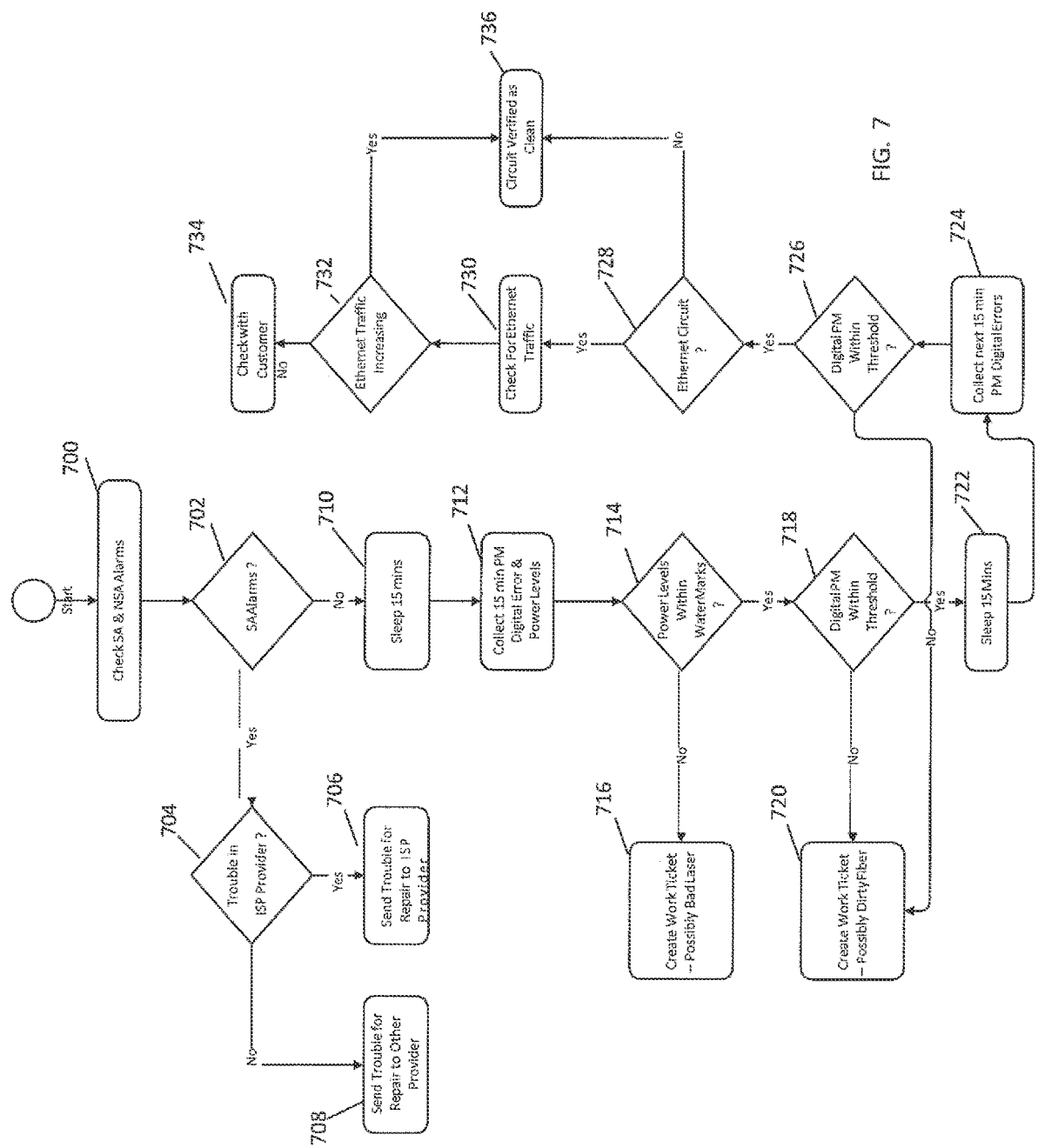
FIG. 7 is an exemplary flowchart of a process to verify the fix of a network after repair failures on a layer 1 transport network by appropriate entity in accordance with the present disclosure.

At 404, monitoring for other alarms may be performed. Some alarms may be generated by equipment being directly surveilled by the ISP Tier 1 provider. Other alarms may be generated based on the detection of error triggers wherein the fault may reside in a leased portion of the backbone network. Exemplary processes for isolating those faults are shown in FIG. 5 and FIG. 6. If one or more alarms are received at 405, the fault is isolated at 406 and one or more trouble tickets may be created for either the ISP Tier 1 service provider or the provider of the leased portion of the backbone network If no alarms are detected at 405, the monitoring functions at 401 and 404 are periodically repeated. If one or more faults or alarms are received and corrected, the corrective action is verified at 408. An exemplary method to verify the corrective action is illustrated in FIG. 7.

The exemplary localization process described above is shown in FIG. 5 and FIG. 6. At 501, a LAIS is received at ISP Router A. At 502, a PAIS is sent from ISP Router A to ISP Router B. Automation logic, if not already triggered and active, is set to active at 503. At 504, the fault is preliminarily isolated at a point in the leased network upstream from ISP Router B. The preliminary fault location may be reported to the ISP Tier 1 provider at 505.

Further isolation may be performed based on the automation logic in ISP Router A and ISP Router B. If at 506 ISP Router A receives a PAIS, then the fault may be further isolated to have occurred upstream of ISP Router A at 507. If at 506 ISP Router A does not receive a PAIS, then if ISP Router A receives a PRDI at 508, then the fault may be further isolated to have occurred between ISP Router A and ISP Router B.

Turning to FIG. 6, there is shown another exemplary flow chart showing a fault isolation method using the automation logic in ISP Router A and ISP Router B. At 601, a PRDI is received at ISP Router B. At 602, a PAIS is received at ISP Router A. If a LAIS is also received by ISP Router A at 603, then at 605 a fault is reported between ISP Router A and the LTE in a leased network section. If there is not a LAIS received by ISP Router A at 603, then at 604 a check is made to see if a LAIS was received by ISP Router B. If so, then a fault is reported between ISP Router B and the LTE in the leased network section at 606. IF neither ISP Router A or ISP Router B receives a LAIS, then a check to see if either ISP Router A or ISP Router B received a LOS message at 607 or 609, respectively. If ISP Router A received the LOS message, then a fault is reported between ISP Router A and a STE in the leased network at 608. If ISP Router B received the LOS message, then a fault is reported between ISP Router B and a STE in the leased network at 610. If neither ISP Router A or ISP Router B received such a LOS message, the fault may not be capable of further isolation at 611.

The foregoing are exemplary methods only. The automation logic in multiple routers may use some or all of the techniques described above to isolate faults in the leased part of the network that are not capable of being surveilled.

To the extent that any faults are discovered, trouble tickets may be generated and sent to the owner/operator of leased network 301. After repair, it may be beneficial to assure that there are no lingering performance management and verify the same by detecting increasing Ethernet traffic on the repaired backbone circuits or dedicated private line services of customers. In addition, it confirms that the power levels of laser are within the high and low watermarks of the system.

For Ethernet services, there is also provided a methodology to certify the presence of error free Ethernet traffic after repairs. In an aspect, the certification process may begin with an automatic trigger from a service provider entity that has just completed a repair. Upon reception of the trigger, the system may first to check for both service affecting and non-service affecting alarms. If there are no service-affecting alarms, the methodology proposes to gather last fifteen appropriate PM Error data (CV, ES, SES, SEFS, UAS, FC, FCSERR, HCCS, etc.) as well as Power Levels from the two ends of circuit. If after checking the power levels and it is determined that they are outside the high and low water marks, a trouble ticket may be created. If there are no power level issues, then the performance monitoring metrics are compared to determine if they are below a tunable (default zero) threshold based on the SLA with the customer. If the performance management error exceeds the threshold, a trouble ticket may be created. Otherwise, the performance management error is determined to be within the relevant thresholds and the process may be paused and repeated periodically.

With reference to FIG. 7, there is shown a flow chart describing an exemplary method of the present disclosure. This method may be used to test a fix after a repair or to determine the overall performance of the network. At 700, the SA and NSA alarms are checked. At 702, it is determined whether there was an SA alarm. If so, the decision is made at 704 to determine whether the trouble is in a home network or another provider's network. If a home network, then a trouble ticket is generated for the home network at 706. If the SA fault is in another providers network at 704, then a trouble ticket is sent to the other provider at 408. If there are no alarms detected at 702, then the alarm monitoring system may go into sleep mode at 410, which may, for example, last for a nominal fifteen minutes.

Continuing with the flow chart at 712, performance management digital errors and power levels are collected at 712. Those levels may be collected periodically, which period may, for example, be fifteen-minute intervals. At 714, it is determined whether the power levels of lasers are within the appropriate thresholds, or watermarks. If not, then a trouble ticket is created at 716 indicating that there may be a bad laser. If the power levels of lasers are within the thresholds, then the digital performance metrics are checked at 718 to determine if those performance metrics are within the appropriate thresholds. If not, then a trouble ticket may be created at 720 indicated that there may be a dirty fiber (or some other event) causing the degraded performance. If the performance is within the thresholds at 718, then the performance monitoring function may be disabled for a period of time at 422, which time may, for example be fifteen minutes before additional performance metrics are collected at 724. At 726, it is determined whether the new digital performance metrics are within the thresholds. If not, then the process goes back to 720 wherein a trouble ticket detailing the degraded performance is created. It will be understood that loops checking for alarms and for performance monitoring may be set and repeated periodically during operations and those loops and the order shown in FIG. 7 are exemplary only.

At 778, the process for checking Ethernet circuits begins by determining whether there are Ethernet circuits in the relevant portions of the network to be checked. If there is no Ethernet to check, then the circuit is declared clean at 736. If there is an Ethernet network, then the traffic is checked at 730. If the ethernet traffic is increasing or otherwise within thresholds at 732, the circuit is declared clean at 736. If the ethernet traffic is not increasing, the process included a follow-up with the customer at 734. It will be understood that the Ethernet check may also be configured as loops that run periodically and such checks may be serially or in parallel with the alarm and performance monitoring described above, with the process shown in FIG. 7 as being exemplary only.

Quality of Service. After the repair, the systems and methods of the present disclosure provides a test that there are no alarms present as the circuit is returned to carry backbone traffic but also confirms absence of Performance Monitoring (PM) errors. In addition, it confirms that the power levels of laser are within the high and low watermarks of the cards in the layout. It also provides methodology to certify presence of error free Ethernet traffic post repair.

While examples of systems and methods for identifying faults in leased networks have been described in connection with various computing devices/processors, the underlying concepts may be applied to any computing device, processor, or system capable of facilitating or hosting an automated control loop system, including cloud-based systems, proprietary systems or open source systems in which the framework of varying automatic control loop variable solutions may be implemented. The various techniques described herein may be implemented in connection with hardware or software or, where appropriate, with a combination of both. Thus, the methods and devices may take the form of program code (i.e., instructions) embodied in concrete, tangible, storage media having a concrete, tangible, physical structure. Examples of tangible storage media include floppy diskettes, Compact Disc-Read-Only Memory devices (CD-ROMs), Digital Versatile Discs, or, Digital Video Discs (DVDs), hard drives, or any other tangible machine-readable storage medium (computer-readable storage medium). Thus, a computer-readable storage medium is not a signal. A computer-readable storage medium is not a transient signal. Further, a computer-readable storage medium is not a propagating signal. A computer-readable storage medium as described herein is an article of manufacture. When the program code is loaded into and executed by a machine, such as a computer, the machine becomes a device for telecommunications. In the case of program code execution on programmable computers, the computing device will generally include a processor, a storage medium readable by the processor (including volatile or nonvolatile memory or storage elements), at least one input device, and at least one output device. The program(s) can be implemented in assembly or machine language, if desired. The language can be a compiled or interpreted language and may be combined with hardware implementations.

The methods and devices associated with a system as described herein also may be practiced via communications embodied in the form of program code that is transmitted over some transmission medium, such as over electrical wiring or cabling, through fiber optics, or via any other form of transmission, over the air (OTA), or firmware over the air (FOTA), wherein, when the program code is received and loaded into and executed by a machine, such as an Erasable Programmable Read-Only Memory (EPROM), a gate array, a programmable logic device (PLD), a client computer, or the like, the machine becomes an device for implementing telecommunications as described herein. When implemented on a general-purpose processor, the program code combines with the processor to provide a unique device that operates to invoke the functionality of a telecommunications system.

The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A method comprising:
   receiving a first message at a first server indicating that a fault was detected in a leased network, wherein the first server is upstream of the leased network;
   receiving a second message at a second server indicating that the fault was detected in the leased network;
   receiving a third message at the first server;
   wherein the first and second servers are in a controlled network connected with the leased network; and
   isolating the fault based on the first message, the second message and the third message, wherein the isolating the fault further comprises identifying the fault occurred in a portion of the leased network between the first server and the second server or upstream of the first server; and
   wherein the first message includes one of a Line Alarm Indication Signal (LAIS) message and a Path Alarm Indication Signal (PAIS) message,
   the second message includes one of the Path Alarm Indication Signal (PAIS) message and a Path Remote Detect Indication (PRDI), and
   the third message includes one of the Path Alarm Indication Signal (PAIS) message, the Path Remote Detect Indication (PRDI) message and the Line Alarm Indication Signal (LAIS) message, and wherein the first server receives different messages via the first message and the third message, respectively.

2. The method of claim 1, wherein the first message is the Line Alarm Indication Signal (LAIS) message, the second message is the Path Alarm Indication Signal (PAIS) message and the third message is the Path Alarm Indication Signal (PAIS) message, and the isolating the fault further comprises identifying the fault upstream of the first server.

3. The method of claim 2, wherein the receiving the first message at the first server further comprises receiving the first message at a first Internet Service Provider (ISP) router and receiving the second message at the second server further comprises receiving the second message at a second ISP router.

4. The method of claim 3, further comprising:
   triggering automatic logic to be activated in the second ISP router;
   preliminary isolating the fault at a point in the leased network upstream from the second ISP router; and
   reporting a preliminary faulty location to an ISP provider.

5. The method of claim 1, wherein the first message is the Line Alarm Indication Signal (LAIS) message, the second message is the Path Alarm Indication Signal (PAIS) message, and the third message is the Path Remote Detect Indication ("PRDI") message and the isolating the fault further comprises identifying the fault between the first server and the second server.

6. The method of claim 1, wherein the first message is the Path Alarm Indication Signal (PAIS) message, the second message is the Path Remote Detect Indication ("PRDI") message, and the third message is the Line Alarm Indication Signal (LAIS) message, and wherein the isolating the fault identifies the fault between the first server and a line terminating equipment point in the leased network.

7. The method of claim 1, wherein the first message is the Path Alarm Indication Signal (PAIS) message, the second message is the Path Remote Detect Indication ("PRDI") message, and the third message is the Line Alarm Indication Signal (LAIS) message, and wherein the isolating the fault identifies the fault between the second server and a line terminating equipment point in the leased network.

8. The method of claim 1, wherein the first message is the Path Alarm Indication Signal (PAIS) message, the second message is the Path Remote Detect Indication ("PRDI") message, and the third message is a section Loss of Signal (LOS) message, and wherein the isolating the fault identifies the fault between the first server and a section terminating equipment point in the leased network.

9. The method of claim 1, wherein the first message is the Path Alarm Indication Signal (PAIS) message, the second message is the Path Remote Detect Indication ("PRDI") message, and the third message is a section Loss of Signal (LOS) message, and wherein the isolating identifies the fault between the second server and a section terminating equipment point in the leased network.

10. The method of claim 1, further comprising correcting the fault and testing the leased network to verify that the fault has been corrected.

11. A device comprising:
    a processing system including a processor; and
    a memory that stores executable instructions that, when executed by the processing system, facilitate performance of operations, the operations comprising:
    determining that a first message was received at a first server indicating that a fault was detected in a leased network, wherein the first server is upstream of the leased network;
    determining that a second message was received at a second server indicating that the fault was detected in the leased network;
    determining that a third message was received at the first server;
    wherein the first and second servers are in a controlled network connected with the leased network; and
    isolating the fault based on the first message, the second message, and the third message, wherein the isolating the fault further comprises identifying the fault occurred in a portion of the leased network between the first server and the second server or upstream of the first server; and
    wherein the first message includes one of a Line Alarm Indication Signal (LAIS) message and a Path Alarm Indication Signal (PAIS) message,
    the second message includes one of the Path Alarm Indication Signal (PAIS) message and a Path Remote Detect Indication (PRDI), and
    the third message includes one of the Path Alarm Indication Signal (PAIS) message, the Path Remote Detect Indication (PRDI) message and the Line Alarm Indication Signal (LAIS) message, and wherein the first server receives different messages via the first message and the third message, respectively.

12. The device of claim 11, wherein the first message is the Line Alarm Indication Signal (LAIS) message, the second message is the Path Alarm Indication Signal (PAIS) message and the third message is the Path Alarm Indication Signal (PAIS) message, and the isolating identifies the fault upstream of the first server.

13. The device of claim 12, wherein the determining that the first message was received at the first server further comprises determining that the first message was received at a first Internet Service Provider (ISP) router and determining that the second message was received at the second server further comprises determining that the second message was received at a second ISP router.

14. The device of claim 13, wherein the operations further comprises:
triggering automatic logic to be activated in the second ISP router;
preliminary isolating the fault at a point in the leased network upstream from the second ISP router; and
reporting a preliminary faulty location to an ISP provider.

15. The device of claim 11, wherein the first message is a Line Alarm Indication Signal (LAIS) message, the second message is the Path Alarm Indication Signal (PAIS) message and the third message is the Path Remote Detect Indication ("PRDI") message and the isolating identifies the fault between the first server and the second server.

16. The device of claim 11, wherein the first message is the Path Alarm Indication Signal (PAIS) message, the second message is the Path Remote Detect Indication ("PRDI") message, and the third message is the Line Alarm Indication Signal (LAIS) message, and wherein the isolating identifies the fault between the first server and a line terminating equipment point in the leased network.

17. The device of claim 11, wherein the first message is the Path Alarm Indication Signal (PAIS) message, the second message is the Path Remote Detect Indication ("PRDI") message, and the third message being ais the Line Alarm Indication Signal (LAIS) message, and wherein the isolating identifies the fault between the second server and a line terminating equipment point in the leased network.

18. A non-transitory machine-readable medium, comprising executable instructions that, when executed by a processing system including a processor, facilitate performance of operations, the operations comprising:
determining that a first message was received at a first server indicating that a fault was detected in a leased network, wherein the first server is upstream of the leased network;
determining that a second message was received at a second server indicating that the fault was detected in the leased network;
determining that a third message was received at the first server;
isolating the fault based on the first message, the second message, and the third message, wherein the isolating the fault further comprises identifying the fault occurred in a portion of the leased network between the first server and the second server or upstream of the first server;
wherein the first and second servers are in a controlled network connected with the leased network, and
wherein the first message includes one of a Line Alarm Indication Signal (LAIS) message and a Path Alarm Indication Signal (PAIS) message,
the second message includes one of the Path Alarm Indication Signal (PAIS) message and a Path Remote Detect Indication (PRDI), and
the third message includes one of the Path Alarm Indication Signal (PAIS) message, the Path Remote Detect Indication (PRDI) message and the Line Alarm Indication Signal (LAIS) message, and wherein the first server receives different messages via the first message and the third message, respectively.

19. The non-transitory machine-readable medium of claim 18, wherein the first message is a Line Alarm Indication Signal (LAIS) message, the second message is the Path Alarm Indication Signal (PAIS) message, and the third message is the Path Alarm Indication Signal (PAIS) message, and the isolating identifies the fault upstream of the first server.

20. The non-transitory machine-readable medium of claim 19, wherein the first message is the Path Alarm Indication Signal (PAIS) message, the second message is the Path Remote Detect Indication (PRDI), and the third message is the Line Alarm Indication Signal (LAIS) message, and wherein the isolating identifies the fault between the first server and a line terminating equipment point in the leased network.

* * * * *